(12) United States Patent
Das et al.

(10) Patent No.: US 9,699,357 B1
(45) Date of Patent: Jul. 4, 2017

(54) PRINTING DEVICES AND METHODS FOR RENDERING A SURFACE USING DIFFERENT COLOR MODES AND PROFILES

(71) Applicant: Xerox Corporation, Norwalk, CT (US)

(72) Inventors: Arindam Das, West Bengal (IN);
Ranita Bej, West Bengal (IN);
Chiranjib Basu, West Bengal (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/144,962

(22) Filed: May 3, 2016

(51) Int. Cl.
*H04N 1/60* (2006.01)
*H04N 1/387* (2006.01)
*H04N 1/21* (2006.01)
*G06K 15/02* (2006.01)
*G06F 3/12* (2006.01)

(52) U.S. Cl.
CPC ......... *H04N 1/6066* (2013.01); *G06F 3/1206* (2013.01); *G06F 3/1208* (2013.01); *G06F 3/1219* (2013.01); *G06F 3/1239* (2013.01); *G06F 3/1241* (2013.01); *G06F 3/1247* (2013.01); *G06F 3/1295* (2013.01); *G06K 15/1807* (2013.01); *G06K 15/1817* (2013.01); *G06K 15/1852* (2013.01); *H04N 1/2104* (2013.01); *H04N 1/3871* (2013.01); *H04N 1/6016* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,715,379 A | 2/1998 | Pavlovic et al. | |
| 6,084,688 A | 7/2000 | Stumbo et al. | |
| 6,498,610 B1 | 12/2002 | Glaspy, Jr. | |
| 7,535,591 B2 * | 5/2009 | Kujirai | G06F 3/1205 358/1.1 |
| 7,573,589 B2 | 8/2009 | Morales et al. | |
| 8,049,928 B2 * | 11/2011 | Uchida | H04N 1/00432 358/1.9 |
| 8,908,228 B2 * | 12/2014 | Qian | G06K 15/02 358/1.18 |
| 8,928,912 B2 * | 1/2015 | Misawa | G06F 3/1212 358/1.15 |
| 9,129,346 B2 * | 9/2015 | Mesh-Iliescu | G06T 9/00 |
| 9,147,143 B2 * | 9/2015 | Mesh-Iliescu | G06K 19/06037 |

(Continued)

*Primary Examiner* — Scott A Rogers
(74) *Attorney, Agent, or Firm* — Gibb & Riley, LLC

(57) ABSTRACT

Disclosed are printing devices and methods that accommodate the use of multiple different output color modes and, thereby multiple different output color profiles and that support user selection of any of the profiles for printing different logical pages on a single print surface. Consequently, they do not require a user to trade off between a desire to achieve a particular result in an image on one logical page, wherein the particular result is only achievable with an extended gamut profile, and a desire to avoid the higher cost associated with unnecessarily using the extended gamut profile to print a different image on a different logical page on the same print surface. Thus, the printing devices and methods provide for rendering of both standard and enhanced quality images on the same print surface in accordance with user selections and for minimizing costs associated with printing (e.g., due to excessive colorant usage).

20 Claims, 5 Drawing Sheets

(56) References Cited

U.S. PATENT DOCUMENTS

| | | | |
|---|---|---|---|
| 9,280,729 B2* | 3/2016 | Yamamoto | G06K 15/027 |
| 2003/0182210 A1* | 9/2003 | Weitzman | G06Q 10/109 |
| | | | 705/26.5 |
| 2003/0184788 A1* | 10/2003 | Watanabe | G06K 15/00 |
| | | | 358/1.13 |
| 2003/0193688 A1 | 10/2003 | Namikata | |
| 2004/0085578 A1* | 5/2004 | Quek | G06Q 30/02 |
| | | | 358/1.18 |
| 2005/0008387 A1* | 1/2005 | Sato | G06F 17/211 |
| | | | 399/81 |
| 2005/0036159 A1 | 2/2005 | Sharma et al. | |
| 2006/0061793 A1* | 3/2006 | Nishikawa | G06F 17/21 |
| | | | 358/1.13 |
| 2011/0012929 A1* | 1/2011 | Grosz | G06F 17/3028 |
| | | | 345/661 |
| 2012/0176631 A1 | 7/2012 | Walp et al. | |
| 2014/0092424 A1* | 4/2014 | Grosz | G06F 3/0484 |
| | | | 358/1.15 |
| 2015/0078774 A1 | 3/2015 | Robinson et al. | |
| 2015/0271364 A1 | 9/2015 | Chapman et al. | |

\* cited by examiner

PRINTING DEVICES AND METHODS FOR RENDERING A SURFACE USING DIFFERENT COLOR MODES AND PROFILES

BACKGROUND

The devices and methods disclosed herein generally relate to color printing and, more particularly, to printing devices and methods that accommodate the use of multiple different output color modes and associated output color profiles.

Conventional printing devices print using subtractive color mixing printing techniques that illuminate colored filters with white light from behind. Typically, these printing devices are operated in a four-color mode. That is, they print an image on a print surface using a four-color output color profile and, particularly, four different colorants (e.g., toner or ink) including the subtractive primary colors, which are cyan (C), magenta (M), and yellow (Y), and black (K). This four-color output color profile is referred to as the CMYK profile and can be used to produce the greatest number of different colors on a printed surface using the least amount of colorant.

Recently printing devices have been developed that can be selectively operated in one of multiple different color modes. That is, these printing devices can accommodate multiple different output color profiles, each comprising different numbers of colorants. For example, these printing devices can be selectively operated in a four-color mode (e.g., with the CMYK profile), as described above, or in a 5-color or higher mode (e.g., with an extended gamut profile). An extended gamut profile is a color profile that includes the four colorants mentioned above (i.e., CMYK), plus 1, 2, 3, etc. additional colorant(s). Thus, the extended gamut profile is referred to as a CMYKX profile. An "additional colorant" in an extended gamut profile could be a colored colorant in the traditional sense (e.g., a red colorant, an orange colorant, a green colorant, a violet colorant, etc.), which allows for an even greater number of different colors to be printed on a printed surface. An "additional colorant" in an extended gamut profile could also be a colorant that exhibits some other unique property (e.g., a magnetic property, a thermochromatic property, a luminescent property, etc.). When a printing device accommodates multiple different output color modes and, thereby different output color profiles, a user selects one of the different output color profiles (i.e., selects the CMYK profile or a CMYKX profile) for printing a page on a print surface. In making this selection, the user balances: (a) the desire to achieve a visually satisfying printed image (i.e., an enhanced printed image), which is only possible with the CMYKX profile; and (b) a desire to avoid the higher cost associated with using the CMYKX profile instead of the CMYK profile (e.g., due to additional colorant usage). Additionally, in the event that a pre-press printing domain imposition process results in an arrangement wherein multiple logical pages are set to be printed on the same print surface (e.g., as seen in booklet printing, N-up printing, signature printing, etc. in order to obtain faster printing, simply binding and reduce waste), a user selects one of the different output color profiles for printing all of the logical pages on that print surface. This is because current architectures do not allow for printing multiple logical pages on the same print surface using different color modes (i.e., using different number of colorants in the output color profiles). Thus, in making this selection, the user must further balance: (a) the desire to achieve a visually satisfying printed image, which is only possible with the CMYKX profile; and (b) a desire to avoid the higher cost associated with unnecessarily using that same CMYKX profile for another printed image, which doesn't require the extended gamut, on the same print surface.

SUMMARY

In view of the foregoing, disclosed herein are printing devices and methods that can accommodate the use of multiple output color modes (e.g., a 4-color and a 5-color or higher mode) and, thereby different output color profiles (e.g., a CMYK profile and an extended gamut profile) and that can also support user selection of any of the different output color profiles for printing different logical pages on a single print surface (e.g., during booklet printing, N-up printing, or signature printing). That is, these printing devices and methods allow at least two different output color profiles associated with different output color modes (e.g., a 4-color mode and a 5-color or higher mode) to be used to print images for at least two different logical pages on the same print surface. Consequently, they do not require a user to trade off between a desire to achieve a particular result in an image on one logical page (i.e., a desire to have an enhanced printed image on one logical page), wherein the particular result is only achievable with the extended gamut profile, and a desire to avoid the higher cost (e.g., due to additional colorant usage) associated with unnecessarily using the extended gamut profile to print a different image on a different logical page on the same print surface. Thus, these printing devices and methods provide for rendering of both standard quality images and enhanced quality images on the same print surface in accordance with user selections and also provide for minimizing costs associated with printing (e.g., due to excessive colorant usage).

More particularly, disclosed herein are printing devices suitable for processing a print job request that requires printing different logical pages having different output color profiles associated with different color modes (e.g., a 4-color mode and a 5-color or higher mode) on the same print surface (e.g., during booklet printing, N-up printing, or signature printing).

Generally, each printing device disclosed herein can comprise an input and a memory. The printing device can further comprise a controller in communication with the input and the memory.

The input can receive a print job request comprising printing domain imposition instructions. Specifically, the instructions can require printing both a first logical page and a second logical page on a single print surface. The instructions can further indicate that the first logical page has a first output color profile, which is associated with a first color mode and, particularly, a first number of colorants, and that the second logical page has a second output color profile, which is associated with a second color mode and, particularly, a second number of colorants that is less than the first number.

The controller can process the first logical page so as to generate first image data and can process the second logical page so as to generate second image data. The controller can further append the second image data to generate appended second image data such that dimensions of the first image data and the appended second image data are equal. Specifically, the controller can append the second image data by adding at least one pseudo layer of dimension with a void extended gamut to the second image data to ensure that the dimensions of the first image data and the appended second image data are equal, thereby removing any dimension mismatch between the first image data and the appended second image data. The first image data and the appended second image data can be stored in a single consolidated buffer in the memory and can, subsequently, be accessed for use in printing the first logical page and the second logical page on the same print surface. Thus, images in the second logical page, which would otherwise be rendered using a lesser number of colorants, get virtually uplifted so as to have the same dimensions as the images in the first logical page by employing the pseudo layer(s) in the appended second image data to indicate the second output color profile with the void extended gamut.

More specifically, a printing device disclosed herein can comprise an input, a memory, a buffer manager, a print engine, and a print controller. The printing device can further comprise a digital front end (DFE) controller that is in communication with the input, the memory, and the print controller.

The input can receive a print job request comprising printing domain imposition instructions. Specifically, the instructions can require printing both a first logical page and a second logical page on a single print surface. The instructions can further indicate that the first logical page has a first output color profile, which is associated with a first number of colorants, and that the second logical page has a second output color profile, which is associated with a second number of colorants that is less than the first number.

The DFE controller can comprise multiple common decomposer facilities including at least a first common decomposer facility and a second common decomposer facility. The first common decomposer facility can process the first logical page so as to generate first image data. The second common decomposer facility can process the second logical page so as to generate second image data. The second common decomposer facility can further append the second image data to generate appended second image data such that dimensions of the first image data and the appended second image data are equal. Specifically, the second common decomposer facility can append the second image data by adding at least one pseudo layer of dimension with a void extended gamut to the second image data to ensure that the dimensions of the first image data and the appended second image data are equal, thereby removing any dimension mismatch between the first image data and the appended second image data.

The buffer manager can initially store the first image data in a first buffer in the memory and the appended second image data in a second buffer in the memory. The buffer manager can subsequently consolidate the first image data from the first buffer and the appended second image data from the second buffer into a consolidated buffer in the memory.

The print controller can cause the first image data and the appended second image data to be read by the print engine from the consolidated buffer and the print engine can print both the first logical page and the second logical page onto the same print surface based on the first image data and the appended second image data, respectively. Thus, images in the second logical page, which would otherwise be rendered using a lesser number of colorants, get virtually uplifted so as to have the same dimensions as the images in the first logical page by employing the pseudo layer(s) in the appended second image data to indicate the second output color profile with the void extended gamut.

Also disclosed herein are printing methods for processing a print job request that requires printing different logical pages having different output color profiles on the same print surface (e.g., during booklet printing, N-up printing, or signature printing).

Generally, each printing method disclosed herein can comprise receiving a print job request comprising printing domain imposition instructions. Specifically, the instructions can require printing both a first logical page and a second logical page on a single print surface. The instructions can further indicate that the first logical page has a first output color profile, which is associated with a first number of colorants, and that the second logical page has a second output color profile, which is associated with a second number of colorants that is less than the first number. Then, the first logical page can be processed so as to generate first image data and the second logical page can be processed so as to generate second image data. Additionally, the second image data can be appended to generate appended second image data such that dimensions of the first image data and the appended second image data are equal. Specifically, the second image data can be appended by adding of at least one pseudo layer of dimension with a void extended gamut to the second image data to ensure that the dimensions of the first image data and the appended second image data are equal, thereby removing any dimension mismatch between the first image data and the appended second image data. The first image data and the appended second image data can be stored in a single consolidated buffer in the memory and can, subsequently, be accessed for use in printing the first logical page and the second logical page on the same print surface. Thus, images in the second logical page, which would otherwise be rendered using a lesser number of colorants, get virtually uplifted so as to have the same dimensions as the images in the first logical page by employing the pseudo layer(s) in the appended second image data to indicate the second output color profile with the void extended gamut.

More specifically, a printing method disclosed herein can comprise receiving, by a printing device, a print job request comprising printing domain imposition instructions. Specifically, the instructions can require printing both a first logical page and a second logical page on a single print surface. The instructions can further indicate that the first logical page has a first output color profile, which is associated with a first number of colorants, and that the second logical page has a second output color profile, which is associated with a second number of colorants that is less than the first number.

The method can further comprise processing of the first logical page so as to generate first image data. The first logical page can, for example, be processed by a first common decomposer facility of a digital front end (DFE) controller of the printing device. The method can further comprise processing of the second logical page so as to generate second image data and then appending the second image data to generate appended second image data such that dimensions of the first image data and the appended second image data are equal. Specifically, the second image data can be appended by adding of at least one pseudo layer of dimension with a void extended gamut to the second image data to ensure that the dimensions of the first image data and the appended second image data are equal, thereby removing any dimension mismatch between the first image data and the appended second image data. The second logical page can, for example, be processed by a second common decomposer facility of the digital front end (DFE) controller. The second image data can also be appended by that second common decomposer facility.

The method can further comprise initially storing the first image data in a first buffer in the memory and the appended second image data in a second buffer in the memory. Then, consolidating the first image data from the first buffer and the appended second image data from the second buffer into a single consolidated buffer in the memory. The processes of initially storing the first image data in the first buffer and the appended second image data in the first buffer and second buffer, respectively, and subsequently consolidating the data into a consolidated buffer can, for example, be performed by a buffer manager of the printing device.

The method can further comprise reading, by a print engine of the printing device, the first image data and the appended second image data from the consolidated buffer. Finally, the method can comprise printing, by the print engine, both the first logical page and the second logical page onto the same print surface based on the first image data and the appended second image data, respectively. Thus, images in the second logical page, which would otherwise be rendered using a lesser number of colorants, get virtually uplifted so as to have the same dimensions as the images in the first logical page by employing the pseudo layer(s) in the appended second image data to indicate the second output color profile with the void extended gamut.

These and other features are described in, or are apparent from, the following detailed description.

BRIEF DESCRIPTION OF THE DRAWINGS

Various exemplary systems, devices and methods are described in detail below, with reference to the attached drawing figures, in which.

DETAILED DESCRIPTION

Figure 1:
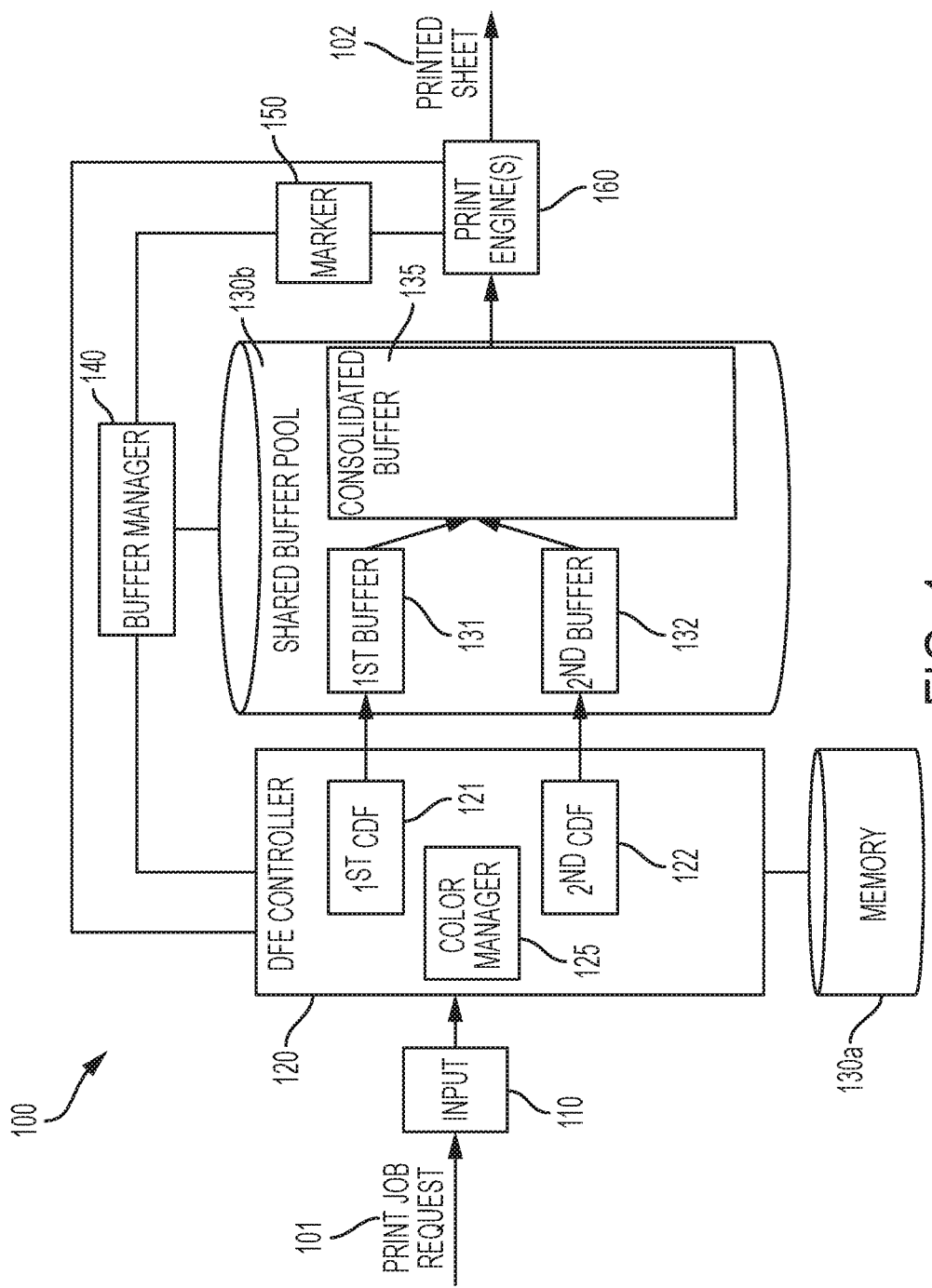
FIG. 1 is a schematic diagram illustrating a printing device for processing a print job request that requires printing different logical pages having different output color profiles on the same print surface.

As mentioned above, conventional printing devices print using subtractive color mixing printing techniques that illuminate colored filters with white light from behind. Typically, these printing devices are operated in a four-color mode. That is, they print an image on a print surface using a four-color output color profile and, particularly, four different colorants (e.g., toner or ink) including the subtractive primary colors, which are cyan (C), magenta (M), and yellow (Y), and black (K). This four-color output color profile is referred to as the CMYK profile and can be used to produce the greatest number of different colors on a printed surface using the least amount of colorant.

Recently printing devices have been developed that can be selectively operated in one of multiple different color modes. That is, these printing devices can accommodate multiple different output color profiles, each comprising different numbers of colorants. For example, these printing devices can be selectively operated in a four-color mode (e.g., with the CMYK profile), as described above, or in a 5-color or higher mode (e.g., with an extended gamut profile). An extended gamut profile is a color profile that includes the four colorants mentioned above (i.e., CMYK), plus 1, 2, 3, etc. additional colorant(s). Thus, the extended gamut profile is referred to as a CMYKX profile. An "additional colorant" in an extended gamut profile could be a colored colorant in the traditional sense (e.g., a red colorant, an orange colorant, a green colorant, a violet colorant, etc.), which allows for an even greater number of different colors to be printed on a printed surface. An "additional colorant" in an extended gamut profile could also be a colorant that exhibits some other unique property (e.g., a magnetic property, a thermochromatic property, a luminescent property, etc.). When a printing device accommodates multiple different output color modes and, thereby different output color profiles, a user selects one of the different output color profiles (i.e., selects the CMYK profile or a CMYKX profile) for printing a page on a print surface. In making this selection, the user balances: (a) the desire to achieve a visually satisfying printed image (i.e., an enhanced printed image), which is only possible with the CMYKX profile; and (b) a desire to avoid the higher cost associated with using the CMYKX profile instead of the CMYK profile (e.g., due to additional colorant usage). Additionally, in the event that a pre-press printing domain imposition process results in an arrangement wherein multiple logical pages are set to be printed on the same print surface (e.g., as seen in booklet printing, N-up printing, signature printing, etc. in order to obtain faster printing, simply binding and reduce waste), a user selects one of the different output color profiles for printing all of the logical pages on that print surface. This is because current architectures do not allow for printing multiple logical pages on the same print surface using different color modes (i.e., using different number of colorants in the output color profiles). Thus, in making this selection, the user must further balance: (a) the desire to achieve a visually satisfying printed image, which is only possible with the CMYKX profile; and (b) a desire to avoid the higher cost associated with unnecessarily using that same CMYKX profile for another printed image, which doesn't require the extended gamut, on the same print surface.

In view of the foregoing, disclosed herein are printing devices and methods that can accommodate the use of multiple output color modes (e.g., a 4-color mode and a 5-color or higher mode) and, thereby different output color profiles (e.g., a CMYK profile and an extended gamut profile) and that can also support user selection of any of the different output color profiles for printing different logical pages on a single print surface (e.g., during booklet printing, N-up printing, or signature printing). That is, these printing devices and methods allow at least two different output color profiles to be used to print images for at least two different logical pages on the same print surface. Consequently, they do not require a user to trade off between a desire to achieve a particular result in an image on one logical page (i.e., a desire to have an enhanced printed image on one logical page), wherein the particular result is only achievable with the extended gamut profile, and a desire to avoid the higher cost (e.g., due to additional colorant usage) associated with unnecessarily using the extended gamut profile to print a different image on a different logical page on the same print surface. Thus, these printing devices and methods provide for rendering of both standard quality images and enhanced quality images on the same print surface in accordance with user selections and also provide for minimizing costs associated with printing (e.g., due to excessive colorant usage).

More particularly, disclosed herein are printing devices suitable for processing a print job request that requires printing different logical pages having different output color profiles on the same print surface (e.g., during booklet printing, N-up printing, or signature printing).

Referring to FIG. 1, a printing device 100 can comprise an input 110 through which a print job request 101 is received. For purposes of this disclosure, a print job request 101 refers to a request to print a document (also referred to as a print job), wherein the request is accompanied by electronic data associated with the pages of the document (e.g., in page description language (PDL) format) and instructions for printing those pages of the document.

Figure 2A:
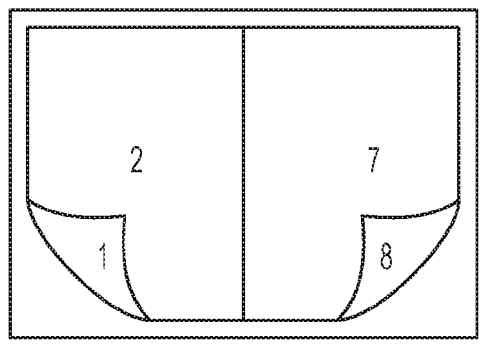
FIGS. 2A-2C are diagrams illustrating an exemplary printing arrangement for an eight-page booklet.
Figure 2B:
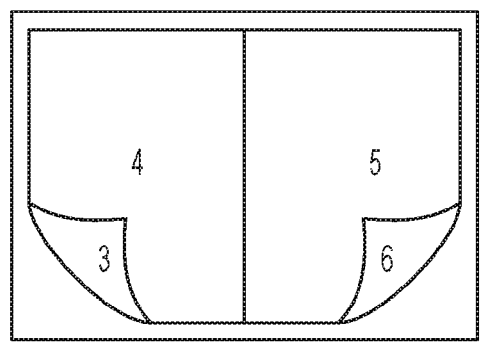
Figure 2C:
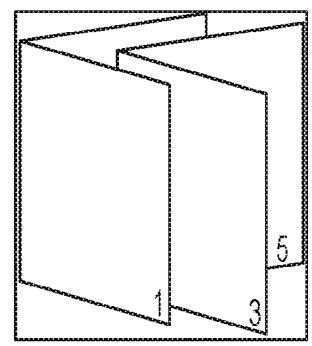

The print job request 101 can, for example, specifically include printing domain imposition instructions, wherein multiple logical pages of the same size are printed on the same print surface of a print sheet. For example, the printing domain imposition instructions could be associated with booklet printing. FIGS. 2A-2C illustrate an exemplary printing arrangement for an eight-page booklet. Two print sheets are used for the booklet. Pages 1 and 8 are to be printed on the back surface of the first print sheet and pages 2 and 7 are to be printed on the front surface of the first print sheet (as shown in FIG. 2A). Pages 3 and 6 are to be printed on the back surface of the second print sheet and pages 4 and 5 are to be printed on the front surface of the second print sheet (as shown in FIG. 2B). Finally, the second print sheet is stacked on the first print sheet and the stack is folded such that the pages of the resulting booklet can be read in logical order 1-8 (as shown in FIG. 2C). Thus, for example, the instructions of the print job request 101 can also require printing of at least two pages (e.g., a first logical page and a second logical page) on a single print surface of a print sheet. Alternatively, the printing domain imposition instructions could be associated with N-up printing, signature printing, or any other printing technique requiring multiple logical pages of the same size to be printed on the same print surface of a print sheet.

As mentioned above, the printing devices disclosed herein are suitable for processing a print job request that requires printing different logical pages having different output color modes and, thereby different output color profiles on the same print surface (e.g., during booklet printing, N-up printing, or signature printing). So, the print job request 101 can also include instructions that indicate the input color profiles associated with the different logical pages to be printed and the desired output color modes and profiles for the different logical pages to be printed on the same print surface.

Thus, for example, the instructions can indicate input color profiles for the first logical page and the second logical page and the instructions can also indicate a first output color profile for the first logical page and a second output color for the second logical page, wherein the first output color profile has a first number of colorants (i.e., is associated with operation of the printing device in a first color mode) and the second output color profile has a second number of colorants that is less than the first number (i.e., is associated with operation of the printing device in a second color mode). In one exemplary case, the input color profiles of the first logical page and the second logical page can be red/green/blue (RGB) profiles. The second output color profile of the second logical page can be a four-color profile such as the cyan/magenta/yellow/black (CMYK) profile and the first output color profile of the first logical page can be an extended gamut profile relative to the second output color profile (e.g., the second output profile can be a 5-color, 6-color, 7-color, etc. profile and, particularly, a cyan/magenta/yellow/black/extended gamut (CMYKX) profile having one, two, three or more color(s) than the second output color profile).

As mentioned above, an "additional colorant" in an extended gamut profile could be a colored colorant in the traditional sense (e.g., a red colorant, an orange colorant, a green colorant, a violet colorant, etc.), which allows for an even greater number of different colors to be printed on a printed surface. An "additional colorant" in an extended gamut profile could also be a colorant that exhibits some other unique property (e.g., a magnetic property, a thermochromatic property, a luminescent property, etc.). The printing device 100 can further comprise various other components in communication, for example, over a system bus. These components can include, but are not limited to, a controller 120, one or more memories 130(a)-(b) including a shared buffer pool 130(b), a buffer manager 140 for managing various buffers in the shared buffer pool 130(b), one or more print engines 160 and a print controller 150 (also referred to herein as a marker) for managing print operations performed by the print engine(s) 160.

The controller 120 can comprise a digital front end (DFE) controller comprising one or more processors capable of executing machine-readable program instructions stored in memory 130(a) for performing various processes on the electronic data associated with the document of the print job request in preparation for printing.

Figure 3:
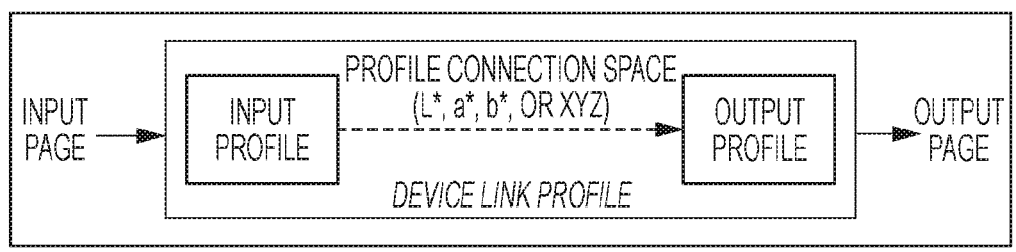
FIG. 3 is a diagram illustrating a device link profile created when an input color mode and profile are mapped to an output color mode and profile.

For example, the DFE controller 120 can comprise a color manager 125. The color manager 125 can perform (i.e., can be adapted to perform, can be configured to perform, can execute a program of instructions to perform, etc.) color space conversion for the logical pages in the print job. Those skilled in the art will recognize that color space conversion refers to a process wherein the colors of a logical page having a given input color mode and profile (e.g., a three-color mode with a red/green/blue (RGB) color profile) are mapped to a particular output color mode and profile (e.g., a four-color mode with a CMYK profile or a 5-color or higher mode with a CMYKX profile, referred to as an extended gamut profile) of the printing device 100 via the Lab, CIE Lab, or XYZ or other suitable color space, using a previously created device link profile that is stored in a memory of the printing device 100 (as illustrated in FIG. 3). Such a device link profile is created when a given input color profile is combined with a given output color profile to produce a mathematical look-up-table, which can be stored in the memory 130(a) and which can be used by the color manager 125 to translate colors from the input device into the best achievable matching colors using the given output color profile. Such color space conversions processes are well known in the art and, thus, the details are omitted from the specification in order to allow the reader to focus on the salient aspects of the disclosed printing devices. In the exemplary case discussed above, the RGB input profile of the first logical page will be converted by the color manager 125 to the CMYKX output profile and the RGB input profile of the second logical page will be converted by the color manager 125 to the CMYK output profile.

The DFE controller 120 can further comprise multiple common decomposer facilities associated with the different output color profiles, respectively. For example, for a printing device 100 capable of printing pages using two different output color profiles including the first output color profile (e.g., CMYKX) and the second output color profile (e.g., CMYK), the DFE controller 120 can comprise a first common decomposer facility 121 (e.g., a first raster image processor (RIP)) for processing logical pages having the first output color profile and a second common decomposer facility 122 (e.g., a second RIP) for processing logical pages having the second output color profile. Those skilled in the art will recognizes that a common decomposer facility, also known as a raster image processor (RIP), is a component that produces a raster image, also known as a bitmap, for each logical page and this raster image will subsequently be used by a print engine 160 to print the logical page on a surface of a print sheet.

The architecture of the DFE controller 120 and particularly the second common decomposer facility 122 can, however, be different than prior art common decomposer facilities in order to allow for printing of both the first logical page having the first output color profile and the second logical page with the second output color profile on the same print surface. That is, the first common decomposer facility 121 can process (i.e., can be adapted to process, can be configured to process, can execute a program of instructions to process, etc.) the first logical page and particularly the page description language (PDL) associated with the first logical page so as to generate first image data (i.e., a first raster image). Similarly, the second common decomposer facility 122 can process (i.e., can be adapted to process, can be configured to process, can execute a program of instructions to process, etc.) the second logical page and particular the PDL associated with the second logical page so as to generate second image data (i.e., a second raster image). Those skilled in the art will recognize that such processing typically comprises multiple stages including interpretation, rendering and screening. These stages are well known in the art and, thus, the details have been omitted from this specification in order to allow the reader to focus on the salient aspect of the disclosed invention. Additionally, since the dimension of the second image data will be less than the first image data due to the reduced number of colorants in the profile (as discussed in greater detail below), the second common decomposer facility 122 can append (i.e., can be adapted to append, can be configured to append, can execute a program of instructions to append, etc.) the second image data to generate appended second image data (i.e., an appended second raster image) such that dimensions of the first image data (i.e., the first raster image) and the appended second image data (i.e., the appended second raster image) are equal. Specifically, the process of appending the second image data can comprise adding at least one pseudo layer of dimension with a void extended gamut (i.e., with a null value in place of the extended gamut) to the second image data to ensure that the dimensions of the first image data and the appended second image data are equal, thereby removing any dimension mismatch between the first image data and the appended second image data. It should be noted that if only one additional color is used in the first output color profile as compared to the second output color profile, only one pseudo layer of dimension would be added to the second image data. If two additional colors are used in the first output color profile as compared to the second output color profile, two pseudo layers of dimension would be added to the second image data; and so on.

More particularly, if the one logical page (I) has a four-color profile and is of size $P \times Q \times 3$ such that $I(p,q,1) \in [0, 255]$, $I(p,q,2) \in [0, 255]$, $I(p,q,3) \in [0, 255]$, where $0 \leq p \leq P$; $0 \leq q \leq Q$, then the size of the output raster image (and the required size of the buffer that stores the raster image) for that logical page would be $P \times Q \times 4$. If another logical page is of the same size, but has a 5-color profile, then the size of the output raster image (and the required size of the buffer rendered from that raster image) would be larger in dimension and, particularly, $P \times Q \times 5$. In other words, the additional color adds an addition layer of dimension (i.e., an additional $P \times Q$) to the resulting raster image and requires a larger buffer such that the two buffers rendered from the two raster images having the two different color profiles, respectively, will have different sizes. In order to print these logical pages on the same print surface, the buffers rendered from the raster images must be consolidated (e.g., by the buffer manager 140) in the shared buffer pool 130($b$). However, such consolidation cannot happen with the buffers have different sizes. Thus, to remove this disparity, the second common decomposer facility 122, which processes the logical pages having the smaller output color profile (e.g., CMYK) can, as mentioned above, add a required number of extra layer(s) of dimension $P \times Q$ with a void extended gamut (referred to as pseudo layer(s) of dimension) to the second image data. This process of appending the second image data virtually lifts up the smaller (e.g., CMYK) output color profile to the larger extended gamut (e.g., CMYKX) output color profile, but leaves null color values in place of the extended gamut.

In this case, the buffer manager 140 can cause the shared buffer pool 130($a$) to initially store the first image data (i.e., the first raster image) in a first buffer 131 and the appended second image data (i.e., the appended second raster image) in a second buffer 132, wherein, due to the up-converting of the second raster image so that it has the same dimensions as the first raster image, the first buffer 131 and the second buffer 132 will be equal in size. As a result, the buffer manager 140 can consolidate (i.e., can be adapted to consolidate, can be configured to consolidate, can execute a program of instructions to consolidate, etc.) the first image data from the first buffer 131 and the appended second image data from the second buffer 132 into the same buffer (i.e., a single consolidated buffer 135).

The print controller 150 (i.e., the marker) can comprise a processor capable of executing machine-readable program instructions stored in a memory (not shown) for performing various processes related to controlling printing operations performed by the print engine(s) 160. For example, the print controller 150 can schedule (i.e., can be adapted to schedule, can be configured to schedule, can execute a program of instructions to schedule) print operations to be performed by the print engine(s) 160. Additionally, the print controller 150 can cause (i.e., can be adapted to cause, can be configured to cause, can execute a program of instructions to cause, etc.) the first image data and the appended second image data to be read to a print engine 160 from the consolidated buffer 135 at the appropriate time. The print engine 160 can then print both the first logical page and the second logical page onto the same print surface of the same print sheet 102 based on the first image data and the appended second image data, respectively. Thus, images in the second logical page, which would otherwise be rendered using a lesser number of colorants, get virtually uplifted so as to have the same dimensions as the images in the first logical page by employing the pseudo layer(s) in the appended second image data to indicate the second output color profile (e.g., CMYK) with the void extended gamut. It should be noted that, since any pseudo layer of dimension added to the second image data by the second common decomposer facility 122 has a void extended gamut, no additional colors over the original output color profile (e.g., CMYK) for the second logical page will be printed and, thus, no unnecessary costs associated with an increase in colorant material will be incurred.

The printing device 100 can further comprise an optional finisher (e.g., a folder, cutter, stapler, booklet maker, collator, or other suitable finisher) for further processing sheets printed as described above by the print engine 160 and an output tray for receiving such printed sheets.

For purposes of illustration, the disclosed printing devices are described above and illustrated in the Figures as being configured for printing a first logical page having a first output color mode and output color profile (e.g., CMYKX) and a second logical page having a second output color mode and profile (e.g., CMYK) on the same print surface. However, it should be understood that the above description is not intended to be limiting. That is, the printing device 100 of FIG. 1 can further be configured for printing more than two logical pages with two or more different color modes and associated output color profiles on the same print surface. For example, the printing device 100 could be configured to print a first logical page with a 6-color mode and a first output color profile that includes CMYK-plus two additional colorants, a second logical page with a 4-color mode and the CMYK, and a third logical page with a 5-color mode and a third output color profile that includes CMYK-plus one additional colorant. In this case, the first common decomposer facility 121 would generate first image data for the first logical page using the first output color profile and the first image data would be stored in the first buffer. The second common decomposer facility 122 would generate second image data for the second logical page using the second output color profile and add two pseudo layers of dimension to the resulting appended second image data so that it has the same dimension as the first image data and store. The appended second image data would be stored in the second buffer. A third common decomposer facility (not shown) in the DFE controller 120 would generate third image data for the third logical page based on the third output color profile and then add a single pseudo layer of dimension to the third image data so that the resulting appended third image data has the same dimensions as the first image data and the appended second image data. The appended third image data would be stored in a third buffer that is equal in size to the first and second buffers. Subsequently, the first image data, the appended second image data, and the appended third image data could be consolidated in a single consolidated buffer and used to print first, second and third logical pages on the same print surface. Similar additional components could be incorporated into the printing device 100 to support printing, on the same print surface, any number of two or more logical pages with any number of two or more different output color modes and output color profiles.

Figure 4A:
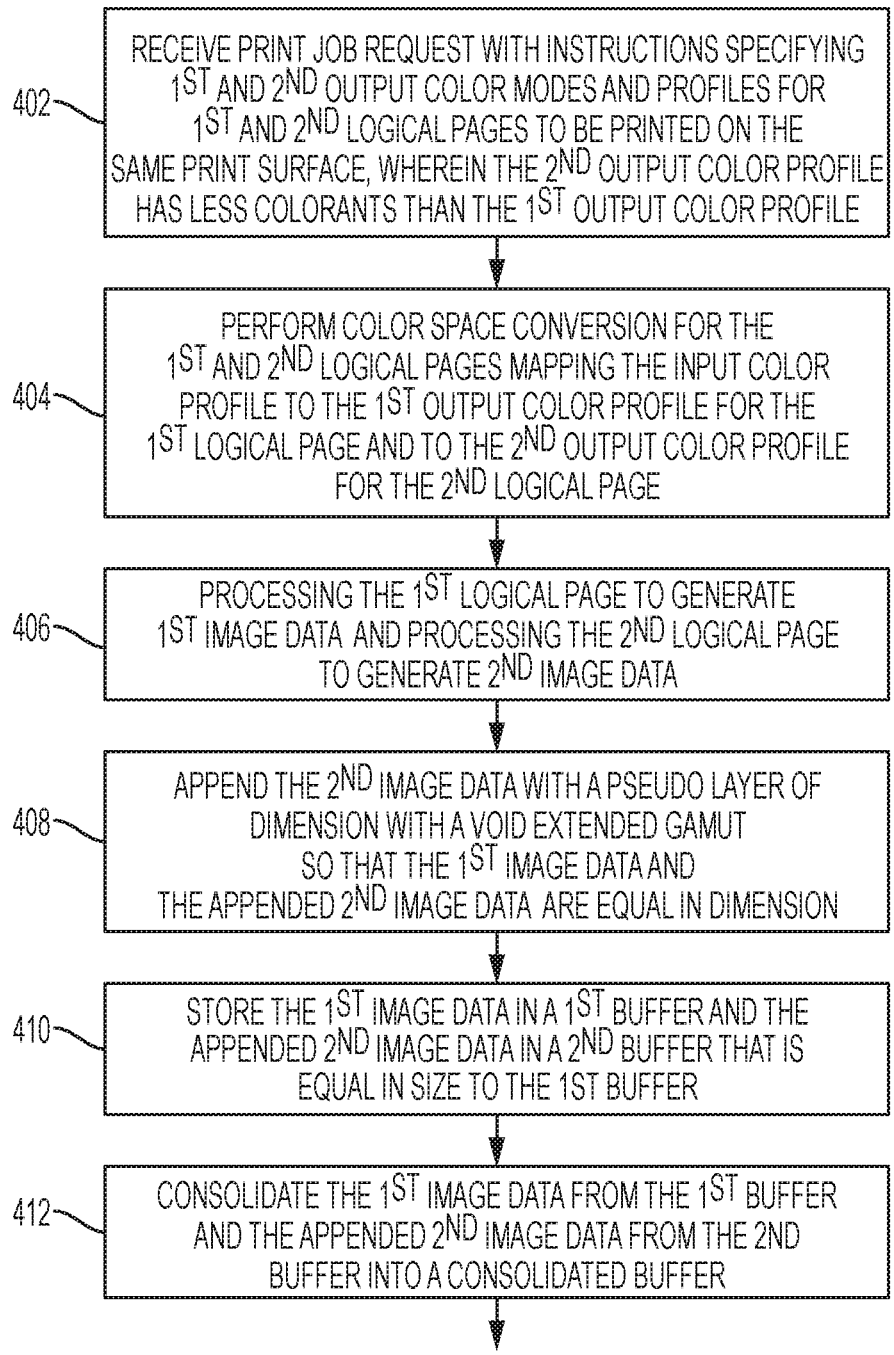
FIGS. 4A-4B show a flow diagram illustrating a printing method for processing a print job request that requires printing different logical pages having different output color profiles on the same print surface.
Figure 4B:
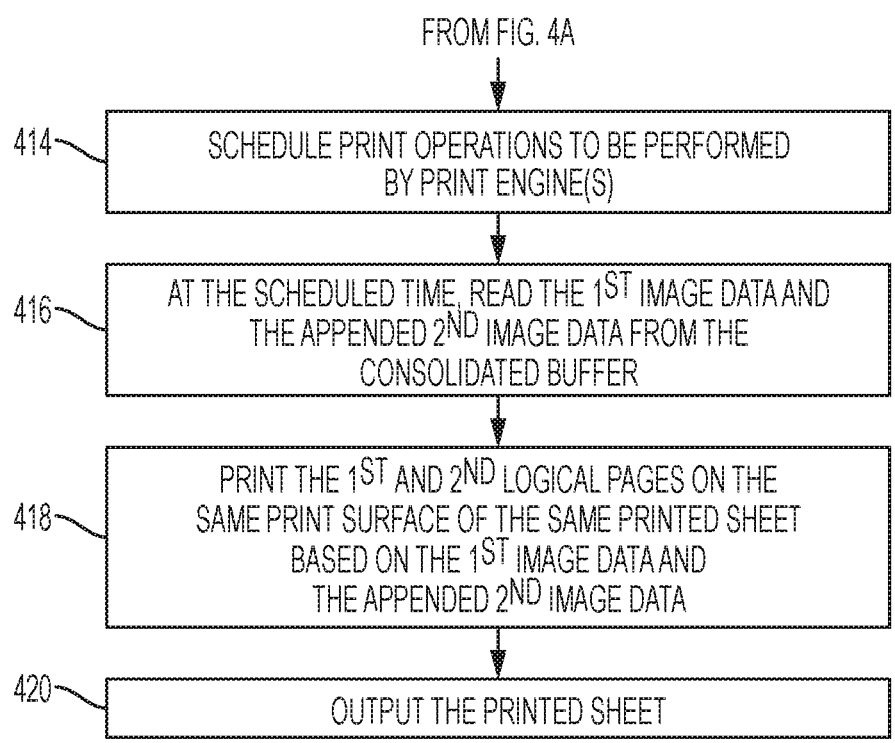

Referring to the flow diagram of FIGS. 4A-4B in combination with the printing device 100 of FIG. 1, also disclosed herein are printing methods for processing a print job request that requires printing different logical pages having different output color profiles on the same print surface (e.g., during booklet printing, N-up printing, or signature printing).

The methods can comprise receiving a print job request 101 (402). The print job request 101 can, for example, be received by a printing device 100 through an input 110. For purposes of this disclosure, a print job request 101 refers to a request to print a document (also referred to as a print job), wherein the request is accompanied by electronic data associated with the pages of the document (e.g., in page description language (PDL) format) and instructions for printing those pages of the document. The print job request 101 can, for example, specifically include printing domain imposition instructions, wherein multiple logical pages of the same size are printed on the same print surface of a print sheet. For example, the printing domain imposition instructions could be associated with booklet printing (as shown in FIGS. 2A-2C and described in detail above). Alternatively, the printing domain imposition instructions could be associated with N-up printing, signature printing, or any other printing technique requiring multiple logical pages of the same size to be printed on the same print surface of a print sheet. The print job request 101 can also include instructions that indicate the input color profiles associated with the different logical pages to be printed and the desired output color profiles for the different logical pages to be printed on the same print surface.

Thus, for example, the instructions can indicate input color profiles for the first logical page and the second logical page and the instructions can also indicate a first output color profile for the first logical page and a second output color for the second logical page, wherein the first output color profile has a first number of colorants (i.e., is associated with printing operation in a first color mode) and the second output color profile has a second number of colorants that is less than the first number (i.e., is associated with printing operation in a second color mode). In one exemplary case, the input color profiles of the first logical page and the second logical page can be red/green/blue (RGB) profiles. The second output color profile of the second logical page can be a four-color profile such as the cyan/magenta/yellow/black (CMYK) profile and the first output color profile of the first logical page can be an extended gamut profile relative to the second output color profile (e.g., the second output profile can be a 5-color, 6-color, 7-color, etc. profile and, particularly, a cyan/magenta/yellow/black/extended gamut (CMYKX) profile having one, two, three or more color(s) than the second output color profile). As discussed in greater detail above with regard to the printing device 100 of FIG. 1, an "additional color" in an extended gamut profile could be a color in the traditional sense (e.g., red, orange, green, violet, etc.) or a colorant that exhibits some other unique property (e.g., a magnetic, thermochromatic, luminescent, etc.).

The methods can further comprise various processing steps so that image data associated with the logical pages of the print job is in print-ready form and stored in buffers. More specifically, the methods can comprise performing color space conversion for each logical page in the print job (404). As discussed in greater detail above with regard to the printing device 100 of FIG. 1, color space conversion can be performed, for example, by a color manager 125 of a digital front end (DFE) controller 120 of the printing device 100 and refers to a process wherein the colors of a logical page having a given input color mode and profile (e.g., a three-color mode with a red/green/blue (RGB) color profile) are mapped to a particular output color mode and profile (e.g., a four-color mode with a CMYK profile or a five-color or higher mode with a CMYKX profile, referred to as an extended gamut profile) of the printing device 100 via the Lab, CIE Lab, or XYZ or other suitable color space, using a previously created device link profile that is stored in a memory of the printing device 100 (as illustrated in FIG. 3). In the exemplary case mentioned above, at process 404, the RGB input profile of the first logical page will be converted by the color manager 125 to the CMYKX output profile and the RGB input profile of the second logical page will be converted by the color manager 125 to the CMYK output profile.

The methods can further comprise processing the first logical page and particularly the page description language (PDL) associated with the first logical page so as to generate first image data (i.e., a first raster image) and, similarly, processing the second logical page and particular the PDL associated with the second logical page so as to generate second image data (i.e., a second raster image) (406). As discussed in detail above with regard to the printing device 100 of FIG. 1, processing of the first logical page having the first output color profile can be performed, for example, by a first common decomposer facility 121 (e.g., a first raster image processor (RIP)) of the DFE controller 120 and processing of the second logical page having the second output color profile can be performed, for example, by a second common decomposer facility 122 (e.g., a second RIP) of the DFE controller 120. Those skilled in the art will recognize that such processing typically comprises multiple stages including interpretation, rendering and screening. These stages are well known in the art and, thus, the details have been omitted from this specification in order to allow the reader to focus on the salient aspect of the disclosed invention.

Additionally, since the dimension of the second image data will be less than the first image data due to the reduced number of colorants in the profile, the method can further comprise appending the second image data to generate appended second image data (i.e., an appended second raster image) such that dimensions of the first image data (i.e., the first raster image) and the appended second image data (i.e., the appended second raster image) are equal (408). Specifically, the process of appending the second image data can, for example, be performed by the second common decomposer facility 122 and can comprise adding at least one pseudo layer of dimension with a void extended gamut (i.e., with a null value in place of the extended gamut) to the second image data to ensure that the dimensions of the first image data and the appended second image data are equal, thereby removing any dimension mismatch between the first image data and the appended second image data. It should be noted that if only one additional color is used in the first output color profile as compared to the second output color profile, only one pseudo layer of dimension would be added to the second image data. If two additional colors are used in the first output color profile as compared to the second output color profile, two pseudo layers of dimension would be added to the second image data; and so on.

More particularly, if the one logical page (I) has a four-color profile and is of size P×Q×3 such that $I(p,q,1) \in [0, 255]$, $I(p,q,2) \in [0, 255]$, $I(p,q,3) \in [0, 255]$, where $0 \le p \le P$; $0 \le q \le Q$, then the size of the output raster image (and the required size of the buffer that stores the raster image) for that logical page would be P×Q×4. If another logical page is of the same size, but has a 5-color profile, then the size of the output raster image (and the required size of the buffer rendered from that raster image) would be larger in dimension and, particularly, P×Q×5. In other words, the additional color adds an addition layer of dimension (i.e., an additional P×Q) to the resulting raster image and requires a larger buffer such that the two buffers rendered from the two raster images having the two different color profiles, respectively, will have different sizes. In order to print these logical pages on the same print surface, the buffers rendered from the raster images must be consolidated in the shared buffer pool (e.g., see shared buffer pool 130(b) of the printing device 100 of FIG. 1). However, such consolidation cannot happen with the buffers have different sizes. Thus, to remove this disparity, some number of extra layer(s) of dimension P×Q with a void extended gamut (referred to as pseudo layer(s) of dimension) are added (e.g., by the second common decomposer facility 122) to the second image data associated with the smaller (e.g., CMYK) output color profile. This process of appending the second image data virtually lifts up the smaller (e.g., CMYK) output color profile to the larger extended gamut (e.g., CMYKX) output color profile, but leaves null color values in place of the extended gamut.

In this case, the first image data (i.e., the first raster image) can initially be stored (e.g., by a buffer manager 140 of the printing device 100) in a first buffer 131 in a shared buffer pool 130(a) and the appended second image data (i.e., the appended second raster image) can initially be stored (e.g., by the buffer manager 140) in a second buffer 132 of the shared buffer pool 130(a) (410). Due to the up-converting of the second raster image so that it has the same dimensions as the first raster image, the first buffer 131 and the second buffer 132 will be equal in size. As a result, the method allows the first image data from the first buffer 131 and the appended second image data from the second buffer 132 to be consolidated (e.g., by the buffer manager 140) into the same buffer (i.e., a single consolidated buffer 135) (412).

The methods can further comprise various processing steps so that image data stored in buffers in the shared buffer pool 130(a) can subsequently be printed by print engine(s) 160 of the printing device 100 of FIG. 1 onto print sheets. More specifically, print operations to be performed by the print engine(s) 160 can be scheduled (e.g., by a print controller 150 of the printing device 100 of FIG. 1) (414). Then, at the scheduled time, the first image data for the first logical page and the appended second image data for the second logical can be read by a print engine 160 from the consolidated buffer 135 and both the first logical page and the second logical page can be printed by the print engine 160 onto the same print surface of a print sheet based on the first image data and the appended second image data, respectively (416)-(418). Thus, images in the second logical page, which would otherwise be rendered using a lesser number of colorants, get virtually uplifted so as to have the same dimensions as the images in the first logical page by employing the pseudo layer(s) in the appended second image data to indicate the second output color profile (e.g., CMYK) with the void extended gamut. It should be noted that, since any pseudo layer of dimension added to the second image data at process 408 has a void extended gamut, no additional colors over the original output color profile (e.g., CMYK) for the second logical page will be printed and, thus, no unnecessary costs associated with an increase in colorant material will be incurred.

Following printing at process 418, the print sheet 102 can be output to, for example, a finisher (e.g., a folder, stapler, booklet maker, collator, or other suitable finisher) for further processing or directly to an output tray (420).

For purposes of illustration, the disclosed printing methods are described above and illustrated in the Figures as being suitable for printing at least a first logical page having a first output color mode and output color profile (e.g., CMYKX) and a second logical page having a second output color mode and profile (e.g., CMYK) on the same print surface. However, it should be understood that the above description is not intended to be limiting. The disclosed printing methods can further be used to print, on the same print surface, any number of two or more different logical pages having any number of two or more different output color modes and output color profiles.

Figure 5:
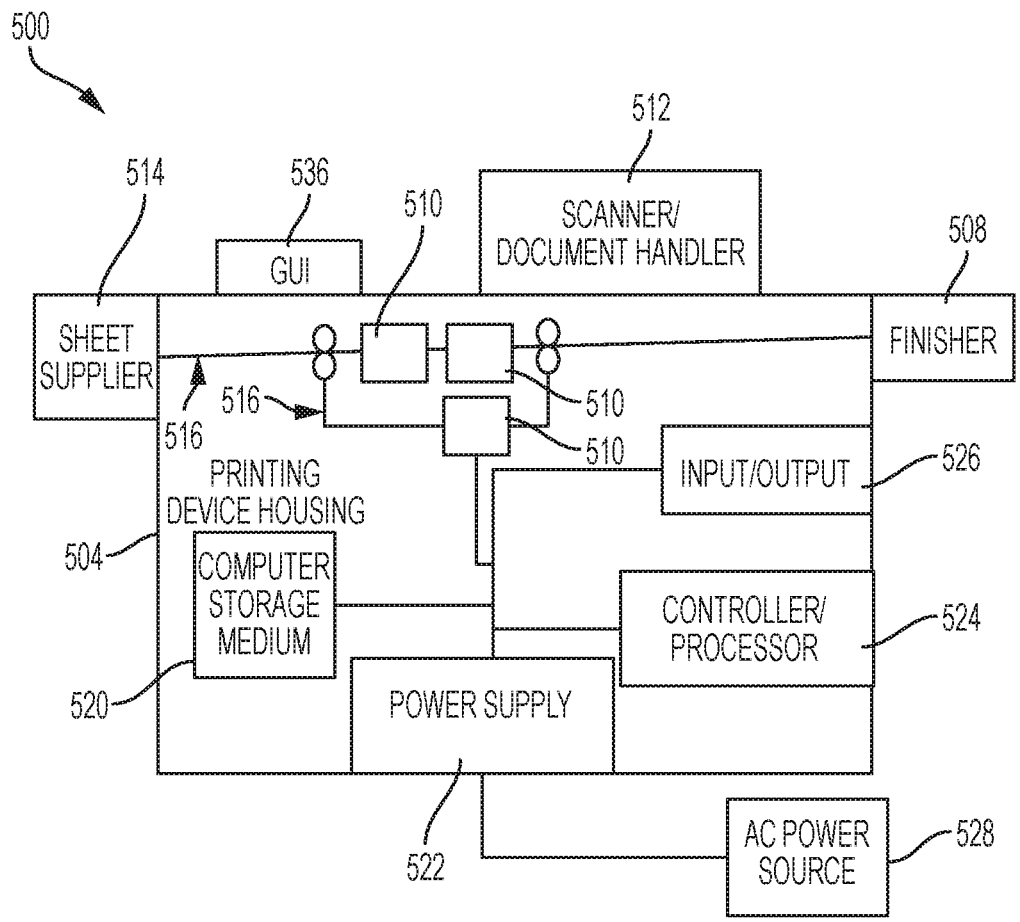
FIG. 5 is a schematic diagram illustrating an exemplary hardware configuration for a computerized multi-function printing device that can be used to implement the disclosed printing devices and methods.

FIG. 5 is a schematic diagram illustrating an exemplary hardware configuration for a computerized printing device 500 and, particularly, a computerized multi-function printing device that can be used to implement the above described printing devices 100 of FIG. 1 and printing methods of FIGS. 4A-4B for processing print job request that requires printing different logical pages having different output color profiles on the same print surface. Such a computerized printing device 500 can comprise a housing 504 and, contained within the housing 504, multiple functional components including, but not limited to, one or more controller/processor(s) 524 (e.g., a digital front end (DFE) controller, a print controller, etc.), a communications port (i.e., an input/output device) 526, one or more memories (including, but not limited to, a non-transitory computer readable storage medium 520 for storing processing instructions and a shared buffer pool, as described above), at least one print media path 516, and at least one print engine 510 (i.e., at least one marking device) operatively connected (e.g., over a system bus). The printing device 500 can further comprise multiple accessory functional components, such as a display screen 536 for displaying a graphic user interface (GUI) for programs executed on the printing device 500, a sheet suppler 514, a document finisher 508 and a document scanner 512 for scanning in image documents, in communication with the controller/processor 524 (e.g., over the system bus). The multiple functional components, including any accessory functional components, can operate on power supplied from an alternating current (AC) source 528 via an internal power supply 522. This internal power supply 522 can comprise a power storage element (e.g., a battery, etc.).

The communications port (i.e., the input/output device) 526 can be used for communications between the printing device 500 and other computerized devices (e.g., a user device or server) over wire or wireless network (e.g., a wireless telecommunication network, such as 3G or 4G wireless telecommunication network, or a local area telecommunication network). The controller/processor(s) 524 can control the various actions of the printing device 500. The non-transitory computer-readable storage medium 520 can comprise, for example, an optical storage device, a magnetic storage device, a capacitor-based storage device or any other suitable computer-readable storage device. This computer-readable storage device can be readable by the controller/processor 524 and can store instructions that the controller/processor 524 can execute to allow the printing device 500 to perform its various functions. The media path(s) 516 can be positioned to transport sheets of media from the sheet supplier 514 through the print engine(s) 510, as controlled by the controller/processor(s) 524. After receiving various markings from the printing engine(s) 510, the sheets of media can be transmitted to an output tray (not shown) or, optionally, to the finisher 508, which can fold, staple, sort, etc., the various printed sheets.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the devices and methods herein cannot be implied or imported from any above example as limitations to any particular order, number, position, size, shape, angle, color, or material.

Therefore, disclosed above are printing devices and methods that can accommodate the use of multiple output color modes (e.g., a 4-color mode and a 5-color or higher mode) and, thereby different output color profiles (e.g., a CMYK profile and an extended gamut profile) and that can also support user selection of any of the different output color profiles for printing different logical pages on a single print surface (e.g., during booklet printing, N-up printing, or signature printing). That is, these printing devices and methods allow at least two different output color profiles to be used to print images for at least two different logical pages on the same print surface. Consequently, they do not require a user to trade off between a desire to achieve a particular result in an image on one logical page (i.e., a desire to have an enhanced printed image on one logical page), wherein the particular result is only achievable with an extended gamut profile, and a desire to avoid the higher cost (e.g., due to additional colorant usage) associated with unnecessarily using the extended gamut profile to print a different image on a different logical page on the same print surface. Thus, these printing devices and methods provide for rendering of both standard quality images and enhanced quality images on the same print surface in accordance with user selections and also provide for minimizing costs associated with printing (e.g., due to excessive colorant usage).

What is claimed is:

1. A printing device comprising:
an input receiving a print job request comprising instructions for printing both a first logical page and a second logical page on a print surface, the first logical page having a first output color profile that is associated with a first number of colorants including at least one extended gamut and the second logical page having a second output color profile that is devoid of the extended gamut such that the second output color profile is associated with a second number of colorants that is less than the first number;
a memory; and,
a controller in communication with the input and the memory, the controller processing the first logical page using the first output color profile so as to generate first image data and processing the second logical page using the second output color profile so as to generate second image data such that the first image data has at least one additional layer of dimension than the second image data,
the controller further appending the second image data to generate appended second image data such that dimensions of the first image data and the appended second image data are equal,
the appending of the second image data to generate the appended second image data being performed by adding, to the second image data, at least one pseudo layer of dimension with a null value in place of the extended gamut to ensure that the dimensions of the first image data and the appended second image data are equal, and
the first image data and the appended second image data being stored in a consolidated buffer in the memory.

2. The printing device of claim 1, the first image data initially being stored in a first buffer in the memory, the second image data initially being stored in a second buffer in the memory and the first image data from the first buffer and the appended second image data from the second buffer subsequently being consolidated into the consolidated buffer.

3. The printing device of claim 1, the instructions specifying printing domain imposition associated with any of booklet printing, N-up printing, and signature printing.

4. The printing device of claim 1, the second output color profile comprising a 4-color profile and the first output color profile comprising a 5-color profile.

5. The printing device of claim 1, the second output color profile comprising a cyan/magenta/yellow/black (CMYK) profile and the first output color profile comprising a cyan/magenta/yellow/black/extended gamut (CMYKX) profile.

6. A printing device comprising:
an input receiving a print job request comprising instructions for printing both a first logical page and a second logical page on a print surface, the first logical page having a first output color profile that is associated with a first number of colorants including at least one extended gamut and the second logical page having a second output color profile that is devoid of the extended gamut such that the second output color profile is associated with a second number of colorants that is less than the first number;
a memory;
a buffer manager;
a print engine;
a print controller; and
a digital front end controller in communication with the input, the memory, the buffer manager, and the print controller, the digital front end controller comprising:
a first common decomposer facility processing the first logical page using the first output color profile so as to generate first image data; and
a second common decomposer facility processing the second logical page using the second output color profile so as to generate second image data, wherein the first image data has at least one additional layer of dimension than the second image data, and further appending the second image data to generate appended second image data such that dimensions of the first image data and the appended second image data are equal,
the appending of the second image data to generate the appended second image data being performed by adding, to the second image data, at least one pseudo layer of dimension with a null value in place of the extended gamut to ensure that the dimensions of the first image data and the appended second image data are equal,
the buffer manager initially storing the first image data in a first buffer in the memory and the appended second image data in a second buffer in the memory and subsequently consolidating the first image data from the first buffer and the appended second image data from the second buffer into a consolidated buffer in the memory,
the print controller causing the first image data and the appended second image data from the consolidated buffer to be read from the consolidated buffer to the print engine, and
the print engine printing both the first logical page and the second logical page onto the print surface based on the first image data and the appended second image data, respectively.

7. The printing device of claim 6, the first buffer and the second buffer being equal in size.

8. The printing device of claim 6, the instructions specifying printing domain imposition associated with any of booklet printing, N-up printing, and signature printing.

9. The printing device of claim 6, the second output color profile comprising a 4-color profile and the first output color profile comprising a 5-color profile.

10. The printing device of claim 6, the second output color profile comprising a cyan/magenta/yellow/black (CMYK) profile and the first output color profile comprising a cyan/magenta/yellow/black/extended gamut (CMYKX) profile.

11. A print job request processing method comprising:
receiving a print job request comprising instructions for printing both a first logical page and a second logical page on a print surface, the first logical page having a first output color profile that is associated with a first number of colorants including at least one extended gamut and the second logical page having a second output color profile that is devoid of the extended gamut such that the second output color profile is associated with a second number of colorants that is less than the first number;
processing the first logical page using the first output color profile so as to generate first image data;
processing the second logical page using the second output color profile so as to generate second image data, the first image data having at least one additional layer of dimension than the second image data;
appending the second image data to generate appended second image data such that dimensions of the first image data and the appended second image data are equal, the appending of the second image data to generate the appended second image data being performed by adding, to the second image data, at least one pseudo layer of dimension with a null value in place of the extended gamut to ensure that the dimensions of the first image data and the appended second image data are equal; and storing both the first image data and the appended second image data in a consolidated buffer in a memory.

12. The method of claim 11, further comprising initially storing the first image data in a first buffer in the memory and the second image data in a second buffer in the same memory, wherein the first buffer and the second buffer are equal in size, and subsequently consolidating the first image data from the first buffer and the appended second image data from the second buffer into the consolidated buffer.

13. The method of claim 11, the instructions specifying printing domain imposition associated with any of booklet printing, N-up printing, and signature printing.

14. The method of claim 11, the second output color profile comprising a 4-color profile and the first output color profile comprising a 5-color profile.

15. The method of claim 11, the second output color profile comprising a cyan/magenta/yellow/black (CMYK) profile and the first output color profile comprising a cyan/magenta/yellow/black/extended gamut (CMYKX) profile.

16. A printing method comprising:

receiving, by input of a printing device, a print job request comprising instructions for printing both a first logical page and a second logical page on a print surface, the first logical page having a first output color profile that is associated with a first number of colorants including at least one extended gamut and the second logical page having a second output color profile that is devoid of the extended gamut such that the second output color profile is associated with a second number of colorants that is less than the first number;

processing, by a digital front end controller of the printing device, the first logical page using the first output color profile so as to generate first image data;

processing, by the digital front end controller, the second logical page using the second output color profile so as to generate second image data such that the first image data has at least one additional layer of dimension than the second image data;

appending, by the digital front end controller, the second image data to generate appended second image data such that dimensions of the first image data and the appended second image data are equal, the appending of the second image data to generate the appended second image data being performed by adding, to the second image data, at least one pseudo layer of dimension with a null value in place of the extended gamut to ensure that the dimensions of the first image data and the appended second image data are equal;

initially storing, by a buffer manager for a memory of the printing device, the first image data in a first buffer in the memory and the appended second image data in a second buffer in the memory;

consolidating, by the buffer manager, the first image data from the first buffer and the appended second image data from the second buffer into a consolidated buffer in the memory;

reading, by a print engine of the printing device, the first image data and the appended second image data to be read from the consolidated buffer; and printing, by the print engine, both the first logical page and the second logical page onto the print surface based on the first image data and the appended second image data, respectively.

17. The printing method of claim 16, the first buffer and the second buffer being equal in size.

18. The printing method of claim 16, the instructions specifying printing domain imposition associated with any of booklet printing, N-up printing, and signature printing.

19. The printing method of claim 16, the second output color profile comprising a 4-color output color profile and the first output color profile comprising a 5-color output color profile.

20. The printing method of claim 16, the second output color profile comprising a cyan/magenta/yellow/black (CMYK) output color profile and the first output color profile comprising a cyan/magenta/yellow/black/extended gamut (CMYKX) output color profile.

* * * * *